Oct. 21, 1969     L. KITCHENMASTER     3,473,567

FLOW EQUALIZER CONTROL

Filed June 8, 1967

Leslie Kitchenmaster
INVENTOR.

BY *Clarence A. O'Brien*
*and Harvey B. Jacobson*
Attorneys

United States Patent Office 3,473,567
Patented Oct. 21, 1969

3,473,567
FLOW EQUALIZER CONTROL
Leslie Kitchenmaster, Brewer, Maine
(702 W. Pine, Junction City, Kans. 66441)
Filed June 8, 1967, Ser. No. 644,690
Int. Cl. E03c 1/044
U.S. Cl. 137—604                    8 Claims

ABSTRACT OF THE DISCLOSURE

A fluid handling device for equalizing the flow of fluid being supplied by two or more conduits in response to the change of flow in one of the supply conduits for discharge through a unitary conduit whereby a generally uniform temperature of the discharged fluid may be maintained and wherein two inlet conduits are placed in coaxial flow relation and adapted to form a unitary outlet conduit including venturi creating means associated with both coaxial inlet conduits whereby an area of reduced pressure is created in the unitary outlet conduit adjacent the venturi means to assist in equalizing the flow of fluid from each of the inlet conduits.

---

Figure 1:
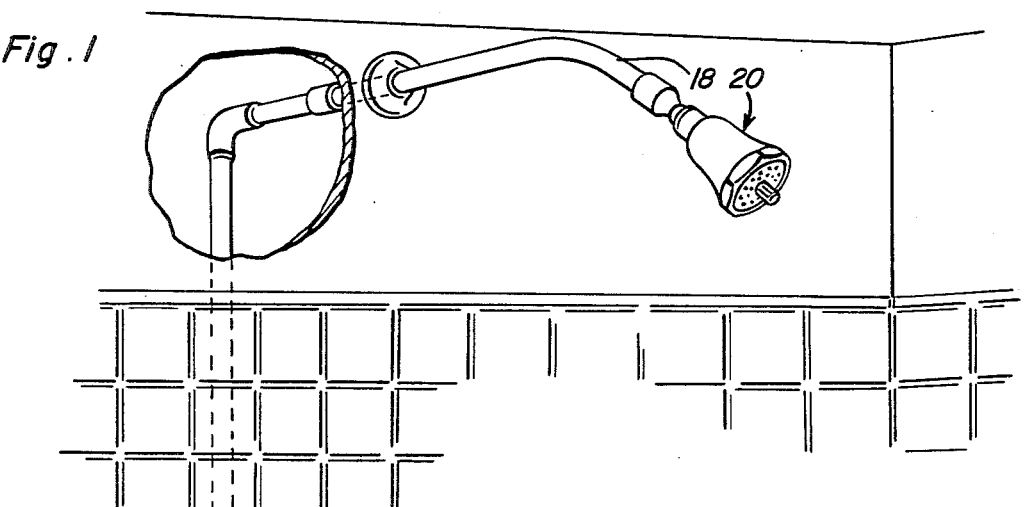
Figure 1:
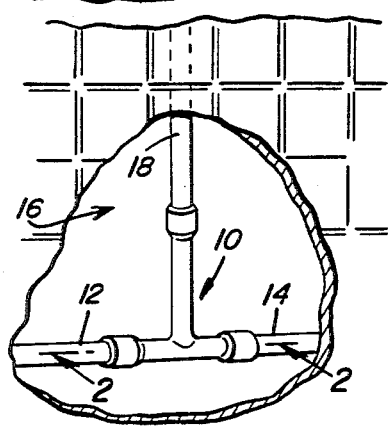

The present invention relates to a flow equalizer device adapted to comprise a portion of a fluid flow combining means. More particularly, the present invention relates to a flow equalizing means for faucets, shower spray heads and the like whereby the flow, and therefore the temperature, of the water discharging from the device may be maintained generally uniform subsequent to initial adjustment of the hot and cold water flowing to the device.

Numerous devices have been proposed heretofore to provide a simple, economical means of maintaining the flow, i.e., and thus the temperature, of water discharging from a faucet, spray head, or the like, substantially uniform subsequent to the presetting of the supply of hot and cold water to the device. However, such devices proposed heretofore are generally unduly complex and are thus costly to manufacture and maintain. In addition, devices have been proposed heretofore to effect the mixing of two incoming fluids, i.e., hot and cold water for example, to provide a tempered unitary outflow. However, these devices generally do not provide a means of equalizing the flow of the respective hot and cold fluids in response to a change in conditions of the supply of fluid to one of the inlet conduits. Accordingly, a need still exists for a simple means of equalizing the unitary flow of fluid from a fluid flow combining device.

It is therefore an object of the present invention to provide a novel construction for a fluid flow equalizer control whereby the flow of admixed fluids from a faucet, shower spray head, and the like, will be maintained relatively uniform regardless of line condition changes, short of a complete shutoff of the fluid in one of the supply conduits connected to the flow equalizer control.

Another object of the present invention is to provide a novel construction for a fluid flow combining and equalizing control wherein the fluids to be combined are placed in coaxial concentric flow, and simultaneously and individually acted upon by a double venturi effect creating means so as to establish a physical condition whereby the temporary reduction of flow of fluid in one of the supply conduits tends to be increased as a result of the partial pressure created by the flow of the other fluid so as to equalize the combined flow of fluid from the device.

A further object of the present invention is to provide a fluid flow combining and flow equalizing device of a novel, simplified, improved and economical construction wherein the inlet conduits carrying the fluids to be admixed are placed in concentric coaxial fluid flow relation and each provided with a "jet pump" venturi creating means whereby the fluid flowing through one inlet conduit will provide a source of power for aspirating water from the other inlet conduit should the flow of fluid in the latter conduit decrease, thereby establishing what will be appreciated is a jet pump within a jet pump.

Still a further object of the present invention is to provide a novel construction for a flow equalizer control which can be cast or otherwise molded from metal, plastic, or the like in a conventional manner analogous to the casting of an ordinary plumbing T-coupling, for example.

A still further object of the present invention is to provide a novel construction for a flow equalizer control for a faucet, shower spray head, or the like comprising a portion of a water distribution system whereby once a predetermined flow of water of a given temperature has been established from the faucet, and the like, and for example, a cold water tap is opened elsewhere in the system, which momentarily drops the cold water pressure below that of the hot water, the hot water in the flow equalizer control will continue at a constant flow and develop a low pressure around its associated hot water "jet pump" means, thus aspirating additional cold water into the device so as to instantaneously reestablish equal flow, without moving parts, regardless of the pressure differential (short of a shut-off) existing between the hot and cold water lines.

Figure 2:
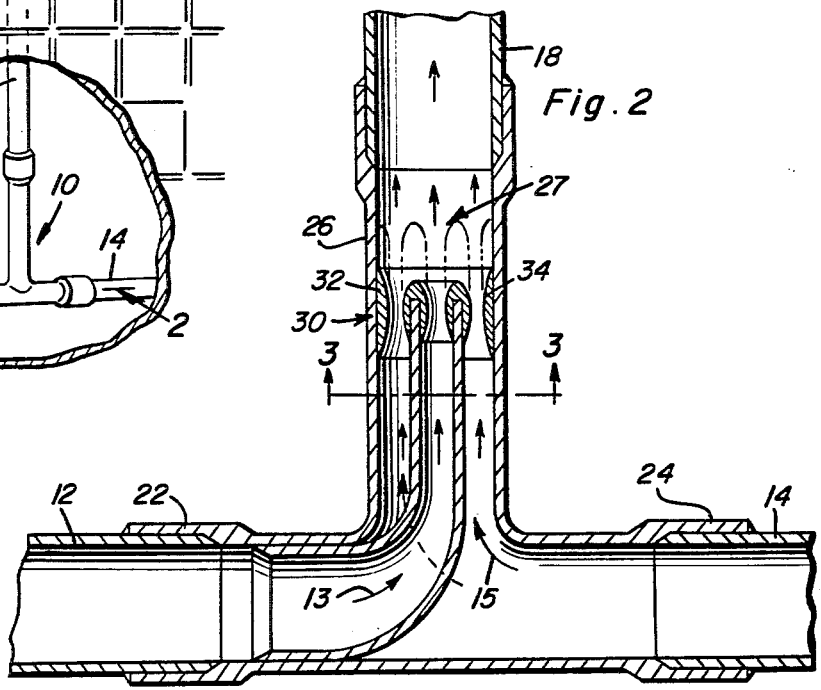
Figure 3:
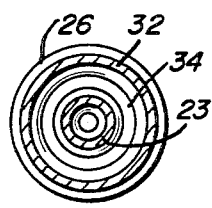

These together with other objects and advantages which will become subsequently apparent reside in the details of construction and operation as more fully hereinafter described and claimed, reference being made to the accompanying drawings forming a part hereof, wherein like numerals refer to like parts throughout, and in which:

FIGURE 1 is a perspective view of an exemplary form of a flow equalizer control constructed in accordance with the present invention shown in an exemplary installation operatively associated with a shower spray head;

FIGURE 2 is an enlarged fragmentary vertical cross-sectional view showing the interior details of the exemplary form of the flow equalizer control illustrated in FIGURE 1 and as taken substantially along the plane of the line 2—2 of FIGURE 1; and FIGURE 3 is a horizontal cross-sectional view of the concentrically disposed fluid inlet conduits of the device of FIGURE 2 taken substantially along the plane of the line 3—3 of FIGURE 2.

Referring now to the drawings in further detail, and particularly FIGURE 1, it will be seen that the exemplary form of the flow equalizer control illustrated therein and indicated generally at 10 is shown operatively connected to hot and cold water inlet conduits 12 and 14 respectively, which elements are shown within a partition indicated generally at 16 which comprises a portion of a shower stall. In addition, the flow equalizer control 10 is shown operatively interposed in the supply conduit 18 of a shower spray head indicated at 20. Although not shown, it will be understood that water flowing through the hot and cold supply conduits 12 and 14, into the flow equalizer control 10, will initially be adjusted by means of conventional valves interposed in the conduits 12 and 14 upstream of the flow equalizer control 10.

Referring now to FIGURE 2 it will be seen that the exemplary form of the flow equalizer control 10 illustrated therein is of a T-configuration and includes a flow equalizer hot water inlet conduit 22, a flow equalizer cold water inlet conduit 24 and a flow equalizer combined fluid flow outlet conduit 26. The hot water inlet conduit 22 further includes a tubular extension portion 23 of decreasing cross-sectional area sealingly received in or integrally formed with the wall of the inlet conduit 22 and concentrically projecting within the outlet conduit 26 whereby hot and cold water, shown by the arrows 13 and 15 respectively in FIGURE 2, will combine in the mixing chamber area 27 of the outlet conduit 26 so as to provide a unitary flow of selectively tempered water to the shower spray head 20.

In order to assure equalized flow of hot and cold water for delivery to the shower spray head 20, once the initial setting has been made, the flow equalizer control device 10 is provided with a double jet pump means indicated generally at 30 which comprises a venturi creating means including a constriction 32 comprising an annular constriction sealingly seated against the interior of the wall of the outlet conduit 26 or integrally formed therewith, which constriction preferably has an "airfoil" cross-sectional configuration. The jet pump means 30 further includes a venturi creating constriction 34, also of annular configuration either secured to or integrally formed with the downstream end of the hot water inlet conduit extension 23, which constriction forming element 34 is preferably also of a bulbous "airfoil" configuration so as to create a restriction of the hot water inlet conduit. The element 34 also cooperates with the restriction element 32 in restricting the annular cold water inlet defined by the outer diameter of the hot water inlet 23 and the inner diameter of the conduit portion 26.

In operation, a suitable flow of water is established through the spray showerhead 20 by utilization of conventional hot and cold water supply valves, not shown which regulate the flow of water through the hot and cold supply conduits 12 and 14 respectively, thus, establishing an initial flow rate of both hot and cold water into the mixing chamber area 27 of the outlet conduit 26. This of course establishes a proportional hot-cold water flow of a given temperature, assuming of course, that the temperature of the hot and cold water being supplied remains substantially constant. From a further consideration of FIGURE 2 it will be appreciated, and as indicated by the areas encompassed by the phantom lines downstream of the venturi constrictions 32 and 34, that areas of reduced pressure will be created due to the acceleration of the hot and cold water passing through the constrictions defined by the members 32 and 34. Accordingly, should, for example, a cold water tap associated with the cold water supply conduit 14, such as in another portion of a home be opened, thus tending to reduce the flow of water through the conduit 14, the area of reduced pressure created downstream of the leading edge of the constriction member 34 by the flow of the hot water will tend to aspirate additional cold water from the conduit 14, so as to equalize the flow of water entering the mixing chamber 27 for discharge through its associated conduit 18 and shower spray head 20 to reestablish the proportional flow originally selected. Conversely, should the flow of hot water be reduced, i.e. such as by a reduction of pressure in the hot water supply conduit 12, the jet pump action of the flow of the cold water will aspirate additional amounts of hot water so as to reestablish the preset proportional flow of hot-cold water. As a dramatic example, in a home provided with the flow equalizing control device 10 of the present invention in association with a shower, even if several cold water valves are opened elsewhere in the home, and there is an associated decrease in the total flow of cold water to the flow equalizing control 10, the jet pump action is such that the upstream valves in the system will generally go without water while the flow equalizer control 10 will equalize the flow of water to the shower spray head 20.

From the foregoing it will be apparent that the flow equalizer control device 10 of the present invention provides a simple, economical means of maintaining a proportional flow of plural fluid streams being admixed for delivery through a unitary outlet.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fluid flow equalizer adapted to be interposed in a fluid handling system to maintain a proportional predetermined flow of plural fluid inflows being combined to form a unitary outflow which comprises a first fluid flow conduit means having a first end connected to a first fluid inflow supplied by the system and a second end connected to a faucet, shower spray head, and the like to which the unitary outflow is to be delivered, a second fluid flow conduit means having a first end connected to a second fluid inflow supplied by the system and a second discharge end terminating within said first fluid flow conduit means in generally concentric relation thereto providing coaxial flow of said fluid inflows, radially and concentrically aligned first and second venturi means carried by said first and second fluid inflow conduit means for establishing radially aligned concentric areas of reduced pressure immediately downstream of said first and said second venturi means whereby the fluid inflow conduit having the greatest flow aspirates an equalizing amount of fluid from the fluid inflow conduit experiencing a partial reduction in flow to equalize the unitary outflow to provide an outflow having component inflows proportioned to the predetermined flow of said first and second fluid inflows.

2. The device of claim 1 wherein said first venturi means comprises an annular member having generally convex inner and outer annular surfaces and being sized so as to partially restrict the discharge end of said second conduit means and assist in partially restricting said first conduit.

3. The device of claim 2 wherein said second venturi means comprises an annular member having a generally convex inner surface and being sized so as to partially restrict an annular flow passage existing between said first and said second conduits.

4. The device of claim 3 wherein said first fluid flow conduit means comprises a T-shaped conduit wherein said second fluid flow conduit means comprises a generally arcuate conduit having one end sealingly secured in one branch conduit of said T-shaped conduit and extending in non-flow blocking concentric relation within another branch conduit of said T-shaped conduit, whereby two separate fluid flows entering said T-shaped conduit will be discharged in generally concentric coaxial unitary flow through a third branch conduit of said T-shaped conduit.

5. In combination with a fluid handling system a fluid flow equalizer comprising a first fluid flow conduit means having a first end connected to a first fluid inflow supplied by the system and a second end connected to a faucet, shower spray head, and the like to which the unitary outflow is to be delivered, a second fluid flow conduit means having a first end connected to a second fluid inflow supplied by the system and a second discharge end terminating within said first fluid flow conduit means in generally concentric relation and providing coaxial flow of said fluid inflows, radially and concentrically aligned first and second venturi means carried by said first and second fluid inflow conduit means for establishing radially aligned concentric areas of reduced pressure immediately downstream of said first and said second venturi means whereby the fluid inflow conduit having the greatest flow aspirates an equalizing amount of fluid from the fluid inflow conduit experiencing a partial reduction in flow to equalize the unitary outflow to provide an outflow having component inflows proportional to the predetermined flow of said first and second fluid inflows.

6. The device of claim 5 wherein said first venturi means comprises an annular member having generally convex inner and outer annular surfaces and being sized so as to partially restrict the discharge end of said second conduit means and assist in partially restricting said first conduit.

7. The device of claim 6 wherein said second venturi means comprises an annular member having a generally convex inner surface and being sized so as to partially restrict an annular flow passage existing between said first and said second conduits.

8. The device of claim 7 wherein said first fluid flow conduit means comprises a T-shaped conduit wherein said second fluid flow conduit means comprises a generally arcuate conduit having one end sealingly secured in one branch conduit of said T-shaped conduit and extending in non-flow blocking concentric relation within another branch conduit of said T-shaped conduit, whereby two separate fluid flows entering said T-shaped conduit will be discharged in generally concentric coaxial unitary flow through a third branch conduit of said T-shaped conduit.

References Cited

UNITED STATES PATENTS 1,031,289  7/1912  Pedley _____ 103—262

FOREIGN PATENTS 161,290  9/1953  Australia.
421,567  12/1934  Great Britain.

WILLIAM F. O'DEA, Primary Examiner

D. H. LAMBERT, Assistant Examiner

U.S. Cl. X.R.

103—262